United States Patent [19]
Adell

[11] Patent Number: 4,852,301
[45] Date of Patent: * Aug. 1, 1989

[54] NON-METALLIC DOOR EDGE GUARD HAVING CLEARANCE TO ADJACENT BODY STRUCTURE

[76] Inventor: Robert Adell, 200 Adell Blvd., Sunnyvale, Tex. 75182

[ * ] Notice: The portion of the term of this patent subsequent to Jun. 28, 2005 has been disclaimed.

[21] Appl. No.: 138,291

[22] Filed: Dec. 28, 1987

Related U.S. Application Data

[63] Continuation-in-part of Ser. No. 56,592, Jun. 1, 1987, Pat. No. 4,753,040.

[51] Int. Cl.$^4$ ............................................. E05F 7/00
[52] U.S. Cl. ................................................... 49/462
[58] Field of Search ..................... 49/462; 52/716–718

[56] References Cited

U.S. PATENT DOCUMENTS 2,226,615  12/1940  Killen ..................................... 49/462

Primary Examiner—Philip C. Kannan

[57] ABSTRACT

One embodiment is of a non-metallic edge guard for the trailing edge of the front door of an automobile in those models where the leading edge of the corresponding rear door, because of the manner in which the rear door is hinged, executes a small component of motion toward the trailing edge of the front door when the rear door is opened. The edge guard's base is thinner than its legs, and the base is thinner toward the inner leg than it is toward the outer leg. Another embodiment has a curved base of reduced thickness over its central region to fit within a gap between the trailing edge of a door and the mating edge of adjacent body structure. The reduced thickness of the base is attained by selective removal of material after the edge guard has been extruded to a basic transverse cross sectional shape. Material is removed mechanically, by grinding or shaving.

12 Claims, 3 Drawing Sheets

NON-METALLIC DOOR EDGE GUARD HAVING CLEARANCE TO ADJACENT BODY STRUCTURE

REFERENCE TO RELATED APPLICATIONS

This application, which is a continuation-in-part of allowed Ser. No. 056,592, filed June 1, 1987, now U.S. Pat. No. 4,753,040, is also related to the applicant's pending allowed application Ser. No. 004,658, filed Jan. 20, 1987, now U.S. Pat. No. 4,730,415, "Non-Metallic Door Edge Guard", and the disclosure thereof is incorporated herein by reference.

BACKGROUND AND SUMMARY OF THE INVENTION

This mechanical invention relates generally to edge guards, and more particularly it relates to novel non-metallic edge guards, for use such as on the trailing edges of swinging closures. The invention also relates to methods for making the edge guards.

Edge guards are used as protective and decorative articles on the edges of objects. In the case of a swinging closure of an automotive vehicle such as an automobile door, an edge guard which is applied to the trailing edge of the swinging closure can provide not only decoration, but also protection when the trailing edge is swung against an object. The edge guard can provide protection not only for the trailing edge of the swinging closure, but also for an object which may be struck by the trailing edge of the swinging closure. That is not to say that an edge guard ca protect and withstand substantial impacts, but edge guards are useful in preventing chipping, knicking, scratching and like damage which typically arises in regular everyday use of an automobile, for example the opening and closing of a car's doors in a confined space such as in a crowded parking lot.

Applicant is the inventor of many edge guard improvements over the years. These improvements are the subjects of many patents. For the most part, these patented improvements relate to metallic edge guards, or insulated metallic edge guards. Metal possesses superior decorative and functional characteristics, and the insulated metallic edge guards advantageously combine the benefits of metallic and non-metallic components.

Although Applicant continues to prefer the insulated metallic type of edge guard for automotive use because of the combination of benefits which it provides, he has discovered novel ways to improve upon non-metallic edge guards which can be useful for certain applications. Certain of these improvements in non-metallic edge guards are the subject of this patent application.

Non-metallic edge guards are not broadly new. Examples exist in prior patents such as U.S. Pat. Nos. 3,547,516 and 4,372,083. While these prior non-metallic edge guards claim to possess certain beneficial characteristics, the truth of the matter is &hat in practice they are difficult to install, especially on contoured edges, and once installed, they may not retain satisfactorily over the life of the automobile. More especially, the improved body fit programs of the automobile manufacturers in recent years render it difficult to fit the non-metallic edge guards onto the doors without interference with the door frame openings when the doors are closed.

The non-metallic edge guard which is the subject of the present invention is intended for use on the trailing edges of the front doors of certain models of four door automobiles, although it may of course be used elsewhere. In those models, the leading edge of each rear door is separated from the trailing edge of the corresponding front door by a small gap. When a rear door is swung open while the corresponding front door remains closed, the leading edge of the rear door executes a component of motion toward the trailing edge of the front door because of the manner in which the rear door is hinged on the automobile's body.

In certain automobile models which have such door designs, door edge guards have not been offered as factory-installed equipment because of certain automobile manufacturers body fit improvement programs which sought to make the fit of body panels, such as doors, much closer to each other. Since door edge guards are typically offered as an option, these body fit improvement programs actually prevented door edge guards from being offered as factory installed options. If the purchaser of one of these models wanted to obtain the benefits of having door edge guards, he had to have them installed by the dealer, and he incurred the cost of having to have the doors readjusted to accomodate the door edge guards.

This problem is also described in applicant's U.S. Pat. No. 4,587,761, and that patent provided a generic solution. The present invention provides a solution which enables door edge guards of non-metallic character as described above to be installed without the necessity of door readjustment.

The present invention also relates to novel methods for making these non-metallic edge guards. According to these methods, any one or more of several accessory tools are used to mechanically selectively remove non-metallic material from a certain region or regions of the edge guard's non-metallic body, after it has been extruded to a preliminary transverse cross section, such removal of material being for the purpose of attaining a desired final transverse cross section, including the attainment of a desired degree of thinness for such region or regions, such thinness being less than the minimum thickness attainable by extrusion given the requirement that at least one leg of the edge guard is extruded to have at least a certain thickness that exceeds the thickness that such region or regions have in the final transverse cross section.

One embodiment of the practice of the method comprises the use of a grinding wheel to abraid material from the extruded cross section at one of said regions; another, the use of a thin wire or blade, which may be heated, to shave, or pare, material away from the extruded cross section.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
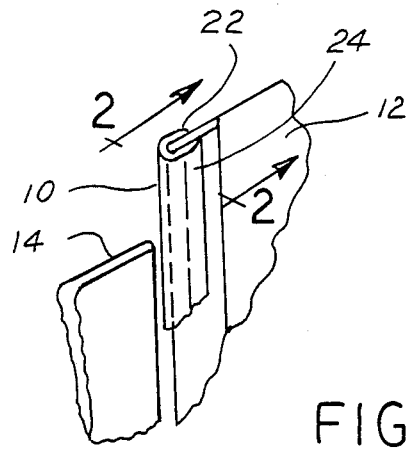
FIG. 1 is a fragmentary perspective view illustrating a first embodiment of door edge guard, embodying principles of the invention, applied to the trailing edge of a front automobile door.

FIG. 1 shows a non-metallic door edge guard 10 embodying principles of the present invention installed on the trailing edge of the left front door 12 of an automobile. The edge guard is an elongate strip of non-metallic material and in transverse cross section has a general U-shape. When door 12 is closed, its trailing edge, on which edge guard 10 is installed, is separated from the leading edge of the rear left door 14 by a small gap The installed edge guard partially fills this gap but does not contact the leading edge of the rear door.

In the models of vehicles described above for which the door edge guard of the invention is particularly adapted, the leading edge of the rear door will move inwardly as the rear door is swung open, and this inward movement will be accompanied by a small component of forward motion. With the present invention, the installed door edge guard is not struck by the leading edge of the rear door as the rear door is swung open. The manner by which this is accomplished will be better understood with reference to FIG. 2 which shows the edge guard's cross sectional shape, as manufactured. When installed on the door edge, the legs are spread more apart than appears in FIG. 2 so they are more parallel with each other.

The general U-shape of edge guard 10 comprises in transverse cross section a generally semi-circular base 20 from opposite ends of which project legs 22, 24. Leg 22 is the outer leg and is disposed against the exterior side of the door trailing edge. Leg 24 is the inner leg and is disposed against the interior side of the door trailing edge. The interior surface of base 20 wraps around the curved end of the door trailing edge. Preferably, substantially the entire interior surface of the edge guard fits against the door edge, and the edge guard is attached by any of the attachment means described in the above referenced application.

In accordance with principles of the present invention to provide clearance for the rear door swing, the edge guard is shaped with a particular shape in the region of where the inside leg merges with the base so that the minimum thickness of the edge guard is along that portion of the base extending from approximately the midpoint of the base, numeral 28, along about 45 degrees of arc to begin merging into the inner leg. The interior surface 30 is radiused along substantially a common radius, preferably 0.070 inch, and the thickness is substantially constant over this region, preferably at 0.005 inch thickness. The center of the radius is at 31. Beyond 45 degrees, the inside surface continues along the 0.070 inch radius extending preferably slightly beyond 90 degrees to merge tangentially into the straight interior surface 32 of the inner leg; however, from the 45 degree point, the exterior surface of the base extends from the exterior radius along a tangent 34 to blend into the straight exterior surface 36 of the inner leg by a curved radius 38. The inner leg has a substantially constant thickness, preferably 0.060 inch, and the distal end of the inner leg is semicircularly shaped to a radius of half its nominal thickness, i.e. a 0.030 inch radius.

The outer leg has a nominal thickness the same as that of the inner leg, i.e. 0.060 inch, and its distal end is also semicircularly shaped. From the base midpoint 28 to where the base merges into the proximal portion of the outer leg, the thickness of the edge guard progressively increases. The interior surface of the base extends from the midpoint of the base along the same 0.070 inch radius to tangentially merge into the straight interior surface 40 of the outer leg. Between the mid-point of the base and where the base merges into the straight exterior surface 42 of the outer leg, the exterior surface of the base extends along an arc 44 such that for any given angular distance about the center 31 as measured from the midpoint of the base, the thickness of the base to the side of the outer leg is larger than it is at the same angular distance from the midpoint of the base to the side of the inner leg. The drawing FIG. 2 is proportioned in accordance with the foregoing dimensions.

The edge guard can be fabricated according to any of the techniques disclosed in the referenced patent application. Typically where it is fabricated from a colored plastic such as PVC, the edge guard will present its particular color as the exterior appearance. It may be desired to apply an insert, such as a transparent mylar encapsulated foil, to present a different decorative appearance, as in the manner described in the examples from the referenced patent application.

Figure 3:
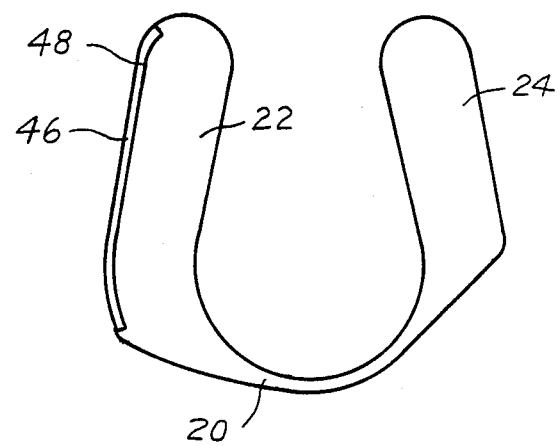
FIG. 3 is a view similar to FIG. 2, but of a second embodiment.
Figure 2:
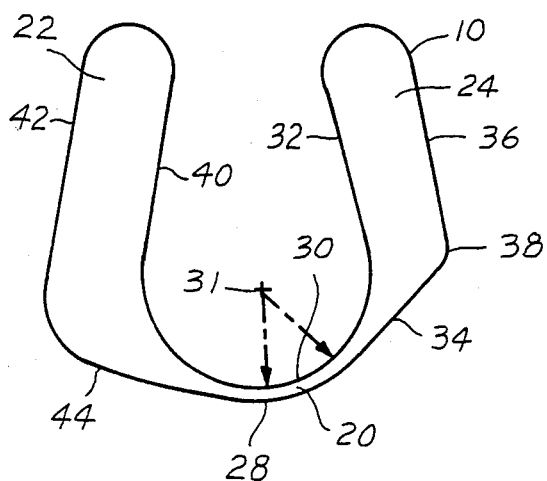
FIG. 2 is a transverse cross sectional view taken in the direction of arrows 2—2 in FIG. 1 on an enlarged scale, but showing the edge guard by itself in the pre-installation shape.

FIG. 3 shows such an insert 46 applied to an edge guard which is like that of FIG. 2 except that the exterior surface of the outer leg is notched as shown at 48 to receive the insert. The insert is fabricated and assembled to the edge guard in the manner described in the referenced patent application.

Figure 4:
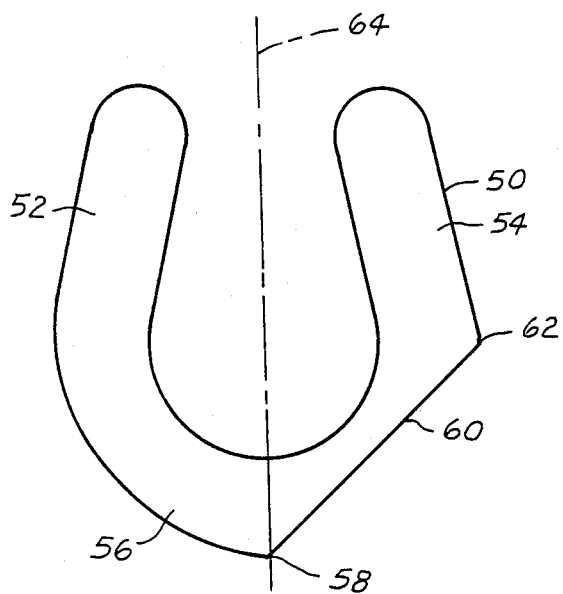
FIG. 4 is a view similar to FIG. 2, but of a third embodiment.

FIG. 4 shows an embodiment of edge guard 50 that comprises outer and inner legs 52, 54 that project from a generally semi-circular base 56. The two legs 52, 54 have thicknesses of 0.060 inch each with semi-circular distal ends. The interior surface of base 56 is curved throughout between the corresponding interior surfaces of legs 52, 54. The exterior surface of base 56 is curved from the exterior surface of leg 52 to substantially the midpoint of the base at the location indicated by the reference numeral 58. The thickness of base 56 from leg 52 to midpoint 58 is substantially the same as that of leg 52, i.e. 0.060 inch. The clearance region that is provided in edge guard 50 for the rear door swing is provided by the chamfer surface 60 which extends from midpoint 58 in substantially flat planar fashion to where it meets the exterior surface of leg 54 at the reference numeral 62.

According to this embodiment of the invention, the thickness of the base between points 58 and 62 progressively decreases from point 58 until about the middle of surface 60 and then progressively increases to point 62. Thus, the minimum thickness of the base occurs at substantially the middle of chamfer 60, in fact just about where the reference numeral 60 is pointing. This point of minimum thickness is nominally dimensioned 0.010 inch plus or minus 0.005 inch.

The chamfer surface 60 is substantially at a 45 degree angle to an imaginary bisector plane 64 that bisects the edge guard. The inside surface of base 56 is dimensioned approximately 0.070 inch radius, and the two legs 52, 54 are canted inwardly each at angles of substantially 12 degrees relative to plane 64. The overall dimension in the direction along plane 64 from midpoint 58 to the extreme distal ends of the two legs is approximately 2.80 inches.

The edge guard 50 is fabricated from PVC or any other equivalent non-metallic material It may be colored to provide a desired color coordination with the edge on which it is installed, or it may be of a clear transparent character so as to enable the underlying color of the edge on which it is installed to be viewed.

Figure 5:
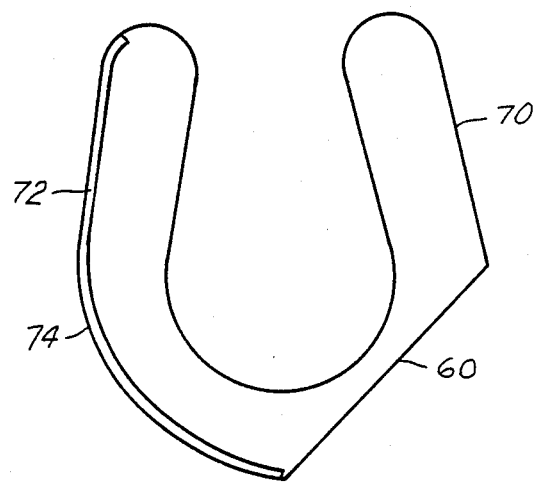
FIG. 5 is a view similar to FIG. 2, but of a fourth embodiment.

Other decorative techniques may be imparted such as that which is portrayed by the embodiment 70 in FIG. 5 which for all intents and purposes is dimensioned the same as that of embodiment 50 except for the inclusion of notch structure 72 fashioned in the exterior surface of the outer leg and the application of a layer 74 to notch 72. The notch structure 72 is provided along substantially the entire exterior of the outer leg and the entire exterior surface of the adjoining half of the base. Hence, for installed appearance purposes this edge guard is similar to the embodiment of FIG. 3. The layer 54 is preferably a metal foil encapsulated in a clear non-metallic material such as mylar, and this layer is fitted to and adhered t the notch structure 72, preferably during the extrusion process of extruding the non-metallic body of the door edge guard. However, other forms of layers could be incorporated and it could be strictly a bare metal foil that is applied to the non-metallic edge guard body. The purpose of this construction is to provide a bright decorative appearance simulating a full metallic edge guard. Vacuum metalizing is another technique to simulate metal. Decorative and ornamental schemes other than those specifically illustrated are contemplated within principles of the invention.

Figure 6:
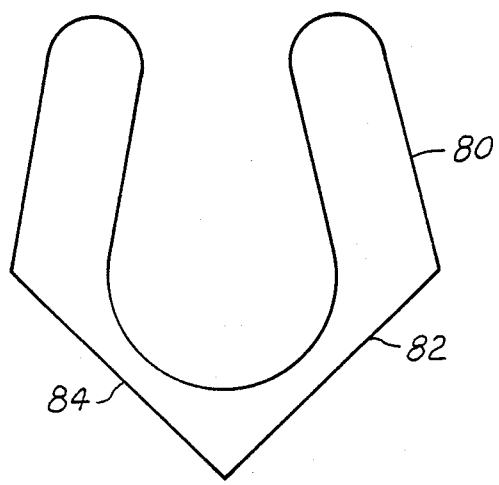
FIG. 6 is a view similar to FIG. 2, but of a fifth embodiment.

FIG. 6 illustrates yet another embodiment 80 which is similar to embodiment 50 except that a pair of chamfers 82, 84 are provided on both sides of the base in a symmetrical manner. The dimensional relationships of both chamfers 82, 84 to the edge guard legs are the same as those described for the chamfer 60 in FIG. 4. The reduced thickness of the base which is toward the outer leg obviously will not provide as much of a protective bumper as in embodiment 50, yet the non-metallic character will not be susceptible to galvanic corrosion.

It has been discovered that conveniences in fabrication of the non-metallic door edge guards with door swing clearance may be achieved by first extruding the non-metallic material to a nominal transverse cross sectional shape and then after the basic shape has more or less stabilized, selectively removing material from one or more selected regions of the edge guard, Particularly the base.

Figure 7:
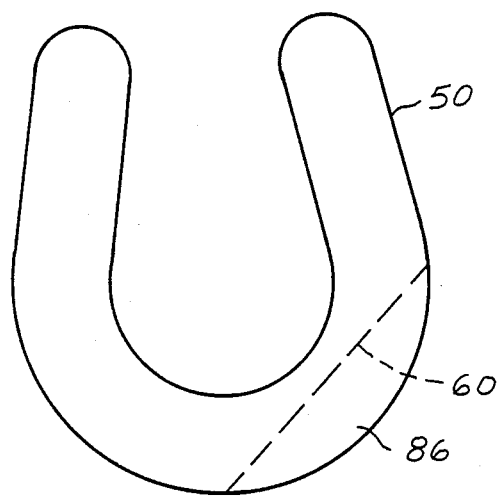
FIG. 7 is a view similar to FIG. 4, illustrative of principles of the method.

FIG. 7 portrays in solid lines the condition to which the edge guard 50 is extruded before the chamfer 60 is created. The chamfer is represented by the broken line 60 in FIG. 7. The zone designated by the reference numeral 86 constitutes a region of material &hat is removed from the preliminary transverse cross section in order to arrive at the final cross section shown in FIG. 4

Figure 8:
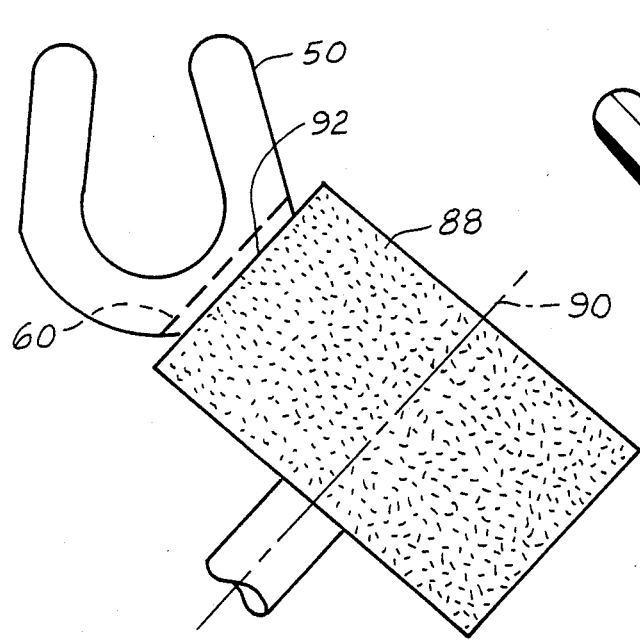
FIG. 8 is a view similar to FIG. 7, on a reduced scale and illustrative of further principles of the method.

Removal of material can be accomplished in different ways. FIG. 8 illustrates the use of a grinding wheel 88 that is rotated about an axis 90. The perimeter surface 92 of the rotating grinding wheel is passed across the edge guard in the manner shown to remove the material 86. The depth of penetration of the grinding wheel into the edge guard is up to the surface 60 . Grinding may be done either wet or dry depending upon various factors. Suitable procedures should be taken to make sure that the wheel does not clog with removed material.

Although the previous embodiment of edge guard has been described for removing material from a certain region of the exterior surface of the door edge guard for a particular door swing interference problem, principles of the invention may also be applied to attain a desired thickness in the base of an edge guard which allows the edge guard to be fitted onto a door edge in which there is a comparatively small gap between the trailing edge onto which the edge guard is to be installed and the mating edge of adjacent body structure, such as a door frame opening, or the forward edge of a rear door.

Figure 9:
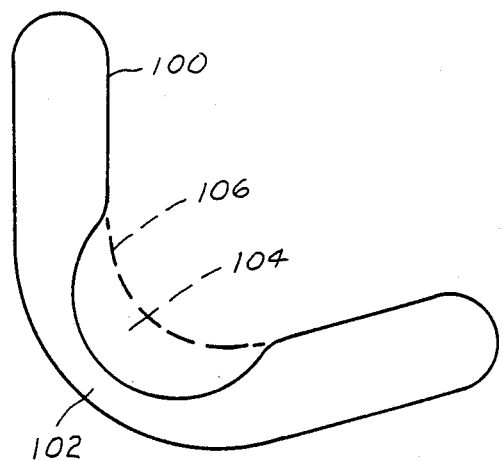
FIG. 9 is a view similar to FIG. 7, but of application of method principles to a sixth embodiment of edge guard.

In FIG. 9 the solid lines represent the finished door edge guard cross section of another embodiment 100. As can be seen, a reduced thickness base 102 is attained by removal of material from the interior surface of the base in the zone that is designated by the reference numeral 104. The area of zone 104 is defined by the broken line 106 and by the interior surface of the base and comprises the material that is removed from the preliminary transverse cross section of the extrusion.

Figure 10:
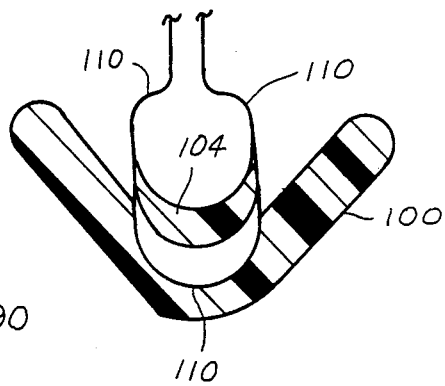
FIG. 10 is a view similar to FIG. 9, but in cross section on a reduced scale and illustrative of further principles of the method applied to the sixth embodiment.

FIG. 10 illustrates a method for removing the material from the embodiment of FIG. 9. A suitably shaped wire or knife edge 110, which may be heated as well, is drawn longitudinally at the appropriate depth relative to the edge guard to pare, or shave, the unwanted material from the non-metallic body. In the practice of the method both in FIGS. 8 and 10, it is to be appreciated that such methods are expeditiously accomplished through the use of suitable power tools and appropriate fixtures for holding the work pieces.

It is also to be observed that the shape of the edge guard shown in FIG. 9 is less closed from the shapes of the preceding embodiment. It is to be understood that principles of the invention may be applied to various embodiments other than those shapes which have been illustrated. Because the reduced thinness area which is needed in the edge guards may tend to attenuate resiliency which would otherwise exist, the edge guards are not considered to be self-retaining in the same sense as are Applicant's insulated metallic edge guards. Hence, the use of separate fastening means such as mechanical fastening devices, bonding, glue, tape, etc., to secure the edge guards on the door edges is typically required.

While a preferred embodiment of the invention has been disclosed, it will be appreciated that principles are applicable to other embodiments. Moreover, while the invention is addressed to solve the problems described, the edge guards can be used on doors where the described problems are not present.

What is claimed is:

1. In an automobile body in combination with the trailing edge of a swinging closure which is separated from a mating edge of adjacent body structure by a gap, the improvement in a decorative and protective edge guard fitted onto the trailing edge of the swinging closure, comprising a non-metallic body that is extruded to a transverse cross section that comprises a curved base fitting over the end of said trailing edge and inner and outer legs extending from said base over the sides of said trailing edge, said non-metallic body having at least one of said legs of thickness greater than that of said base and at least a certain region of said base being provided with thickness less than the thickness of said at least one leg so as to allow the edge guard to fit in said gap without interfering with said adjacent body structure, said at least a certain region of said base being provided with thickness less than the thickness of said at least one leg by the selective removal of material from said non-metallic body subsequent to the extrusion thereof.

2. The improvement set forth in claim 1 in which said at least a certain region of said base comprises the thickness of said base being substantially uniform along an angular extent from the midpoint of said base to approximately 45 degrees toward said at least one leg, and beyond said angular extent, the thickness progressively increases to merge into the thickness of said at least one leg.

3. The improvement set forth in claim 2 in which the interior surface of said base is curved and the exterior surface of said base that comprises said at least a certain region is straight over the extent along which the thickness progressively increases to merge into the thickness of said at least one leg.

4. The improvement set forth in claim 2 in which the thickness of said base along said angular extent is substantially 0.005 inch and the thicknesses of said legs are substantially 0.060 inch.

5. The improvement set forth in claim 5 in which the selective removal of material from said base is conducted on the exterior side of the non-metallic body.

6. The improvement set forth in claim 1 in which the selective removal of material from said base is conducted on the interior side of the non-metallic body.

7. For use with the trailing edge of a swinging closure which is separated from a mating edge of adjacent structure by a gap, an improved decorative and protective edge guard for fitting onto the trailing edge of the swinging closure, comprising a non-metallic body that is extruded to a transverse cross section that comprises a curved base for fitting over the end of said trailing edge and inner and outer legs extending from said base for fitting over the sides of said trailing edge, said body having at least one of said legs of thickness greater than that of said base and the thickness of said base being less than the thickness of at least one leg along a certain region of said base, said certain region being provided with reduced thickness from that of said at least one leg by the selective removal of material from said non-metallic body subsequent to the extrusion thereof.

8. An edge guard as set forth in claim 7 in which the thickness of said certain region of said base is substantially uniform along an angular extent from the midpoint of said base to approximately 45 degrees toward said at least one leg, and beyond said angular extent, the thickness progressively increases to merge into the thickness of said at least one leg.

9. An edge guard as set forth in claim 8 in which the interior surface of said base is curved and the exterior surface of said base along said certain region is straight over the extent along which the thickness progressively increases to merge into the thickness of said at least one leg.

10. An edge guard as set forth in claim 8 in which the thickness of said base along said angular extent is substantially 0.005 inch and the thicknesses of said legs are substantially 0.060 inch.

11. The improvement set forth in claim 7 in which the selective removal of material from said base is conducted on the exterior side of the non-metallic body.

12. The improvement set forth in claim 7 in which the selective removal of material from said base is conducted on the interior side of the non-metallic body.

* * * * *